May 19, 1931.  J. J. MOORE  1,806,361
SAW FILING MACHINE
Filed July 24, 1929  3 Sheets-Sheet 1
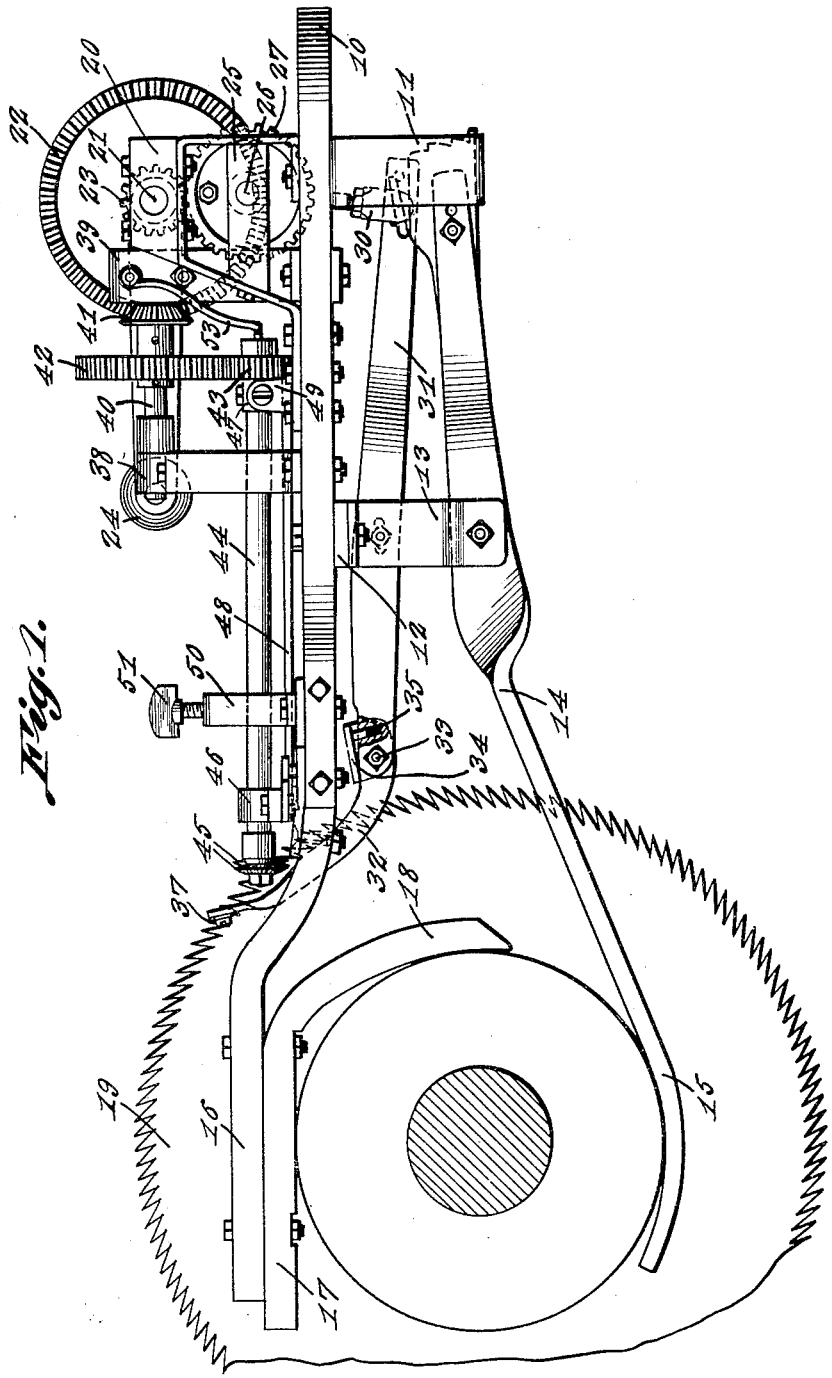
J. J. Moore, INVENTOR
BY Victor J. Evans
ATTORNEY

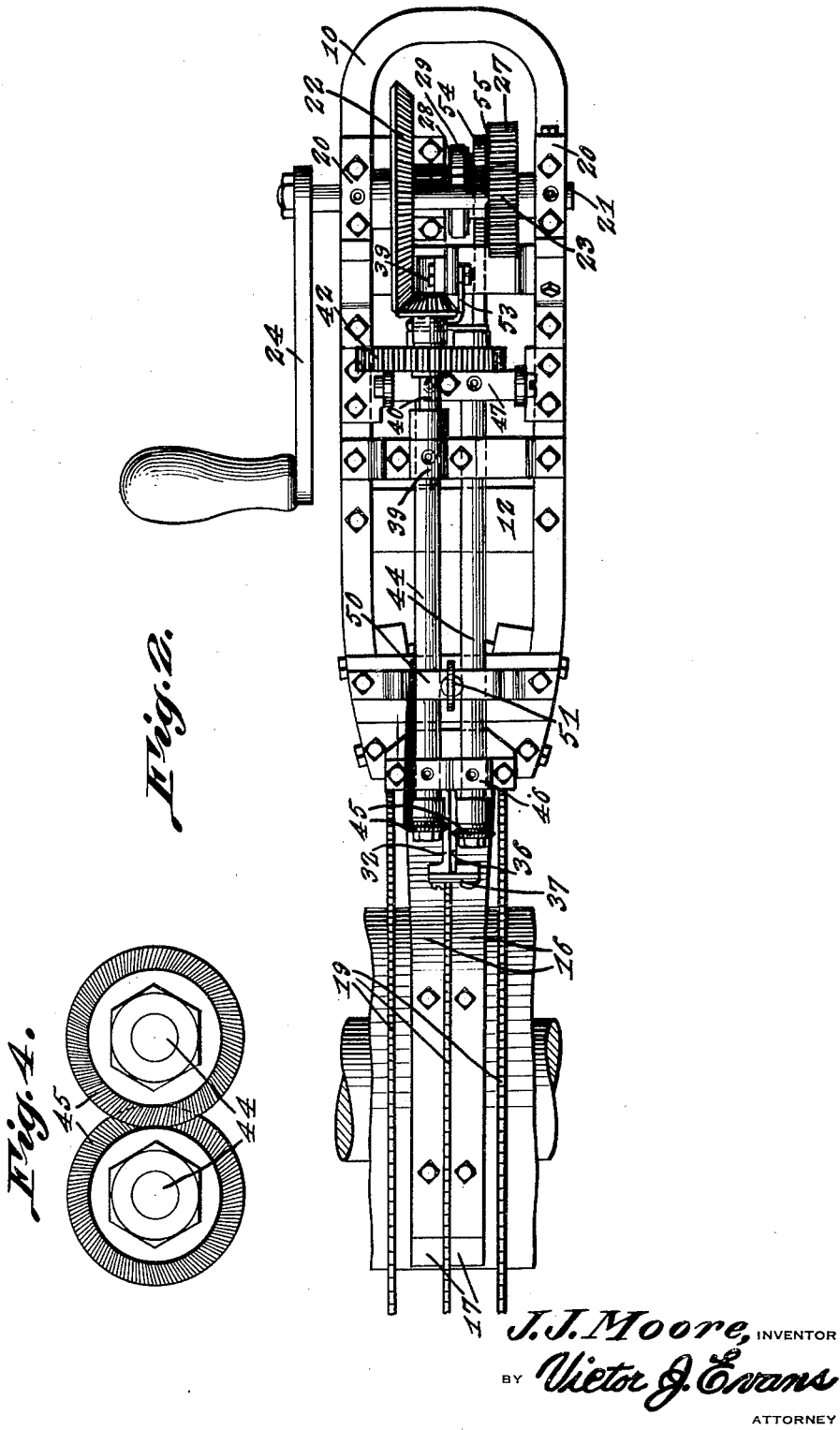

May 19, 1931.   J. J. MOORE   1,806,361
SAW FILING MACHINE
Filed July 24, 1929   3 Sheets-Sheet 3
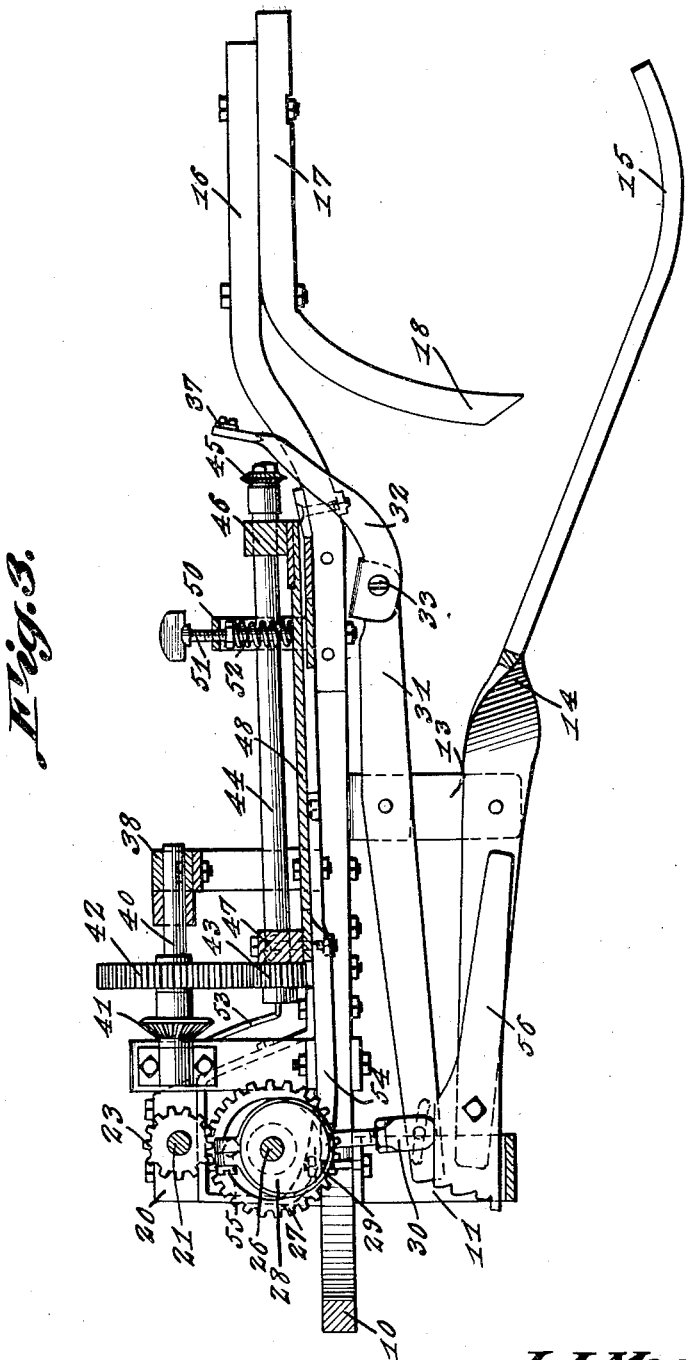
J. J. Moore, INVENTOR
BY Victor J. Evans
ATTORNEY Patented May 19, 1931.

1,806,361

UNITED STATES PATENT OFFICE

JOSEPH JACKSON MOORE, OF KARNACK, TEXAS

SAW FILING MACHINE

Application filed July 24, 1929. Serial No. 380,598.

The present invention contemplates the provision of a machine for filing saws, and embodies amongst other features, a novel construction of means for intermittently shifting the saw to bring each tooth to a proper position to be dealt with, together with means for filing each tooth from the opposite sides of the saw simultaneously, the invention residing in the construction, combination and arrangement of parts as claimed.

In the drawings forming part of this application like numerals of reference indicate similar parts in the several views, and wherein:—

Figure 1 is a side elevation of the machine illustrating how it is used for the purpose intended.

Figure 2 is a top plan view.

Figure 3 is a view looking from the opposite side of the machine from that illustrated in Figure 1 and partly in section.

Figure 4 is a view in elevation of the file.

The machine forming the subject matter of the present invention comprises a frame 10 upon which the various parts are mounted, and depending from this frame adjacent one end is a substantially U-shaped bracket member 11. Connecting the side members of the frame at an appropriate point in their length is a transverse plate 12, while depending from this plate is a suitable bracket 13. Supported by the bracket 13 at a point between its ends, is a bracket arm 14, the latter projecting an appreciable distance beyond the forward end of the frame 10 and terminating to provide a curved portion 15 to cooperate with an upper bracket arm for the purpose of supporting the saw to be filed.

Projecting from the forward end of the frame 10 are spaced bracket arms 16, to the under side of which are secured auxiliary bracket arms 17, the latter being curved downwardly as at 18 to support the saw in the manner illustrated. While the saw is firmly supported in this manner, it is yet allowed to revolve, so that it can be shifted in a manner to be hereinafter described, to bring each tooth into a position to be dealt with. As illustrated in Figure 2, the bracket arms 16 and 17 are slightly spaced apart to allow the saw 19 to operate between the same.

Arranged above the frame adjacent one end and associated therewith in any suitable manner are bearings 20 for the shaft 21, the latter supporting a large gear 22 and a relatively small gear 23. While the shaft may be rotated in any suitable manner, it is preferably provided with a crank handle 24 for this purpose. Journaled in bearings 25, and arranged beneath the shaft 21 is a shaft 26, the latter carrying a large gear 27 which meshes with the adjacent small gear 23 on the shaft 21. An eccentrically mounted disk 28 is carried by the shaft 26 and operates in a band 29, from which depends a yoke 30 having pivotal connection with the adjacent end of a lever 31, the latter being fulcrumed at a point between its ends upon the bracket 13.

This lever 31 forms part of the feeding mechanism, by means of which the saw is intermittently adjusted to bring each tooth into proper position to be dealt with, and this lever is preferably made in two sections, the other section being indicated at 32. The two sections are arranged in end to end relation and pivotally connected together as at 33, while the section 32 is formed with an offset lip 34 which overlies the upper edge of the section 31 and has interposed between said parts a cushioning spring or other element indicated at 35. The section 32 is curved, and passes upwardly between the bracket arms 16 above referred to, and terminates in a relatively broad head portion bifurcated as at 36. Carried by the relatively broad head portion, and bridging the bifurcation is a relatively thin plate 37, which engages the teeth of the saw, to shift the latter in a manner to be hereinafter described.

Journaled in suitable bearings 38 and 39 respectively supported above the frame 10, is a longitudinally disposed shaft 40, and carried by this shaft is a relatively small gear 41 which meshes with the large gear 22 above referred to. Also carried by the shaft 40 is a relatively large gear 42 which meshes with small gears 43 carried by the adjacent ends of a pair of spaced parallel shafts 44, the latter being equipped with the filing disks or wheels 45. It will be noted upon inspection of Figure 2 that these shafts 44 are arranged side by side longitudinally of the frame 10, the forward end of each shaft carrying a filing disk or wheel 45, the wheels being arranged slightly in advance of each other, so that each tooth of the saw is accurately filed from opposite sides simultaneously.

These parallel shafts 44 are journaled in spaced bearings 46 and 47 respectively, and these bearings are carried by a bed plate 48 as clearly illustrated in Figure 3. This entire construction is mounted for slight pivotal movement, inasmuch as the bearing 47 is pivoted between spaced brackets 49 secured to the frame 10 of the machine. Straddling the shaft 44 is a yoke 50, the latter being also secured to the frame 10, while carried by this yoke 50 is an adjusting screw 51 to regulate the tension of a spring 52, the latter being connected with the screw 51 and bearing against the bed plate 48 for a purpose to be hereinafter described. A spring 53 is also attached to a suitable bracket 54, the spring 53 bearing against the adjacent ends of the shaft 44, and cooperating with the spring 52 to lower the shafts and their filing disks to operative position.

In practice, the saw is clamped in position between the bracket arms above described, with the saw so positioned with relation to the filing disks 45, that incident to the rotation of the shafts 44, each tooth will be simultaneously filed from opposite sides. The shafts 44 are, of course, rotated through the gearing connecting the large gear 22 with the small gears 43 carried by these respective shafts. However, during the rotation of the shaft 21 for this purpose, the saw 19 is intermittently rotated, so that after each tooth has been properly filed, the next in order is brought into proper position to be dealt with by the filing disks 45. Consequently during the rotation of the shaft 21, the lever 31 is rocked upon its pivot by reason of its eccentric connection with the shaft 26.

As one end of the lever is moved downwardly, the forward end thereof, or in other words the section 32 is moved upwardly and forwardly over the teeth of the saw. During a continued rotation of the shaft 21 the lever is rocked in an opposite direction, thereby lowering the forward end of the lever, or the section 32 thereof, which in the meantime has engaged one of the teeth of the saw, thereby turning the saw in one direction to bring the next tooth to be filed in proper position with relation to the filing disks 45. While the saw is being turned in this manner, the filing disks 45 are elevated to an out-of-the-way position, by tilting the bed plate 48 which is pivotally mounted upon the bracket 49. For this purpose the bed plate is provided with an arm 54 projecting rearwardly therefrom, and terminating in an upwardly curved portion which is arranged in the path of movement of a pin or roller 55 carried by the gear 27, so that during the rotation of the gear, the pin or roller 55 strikes the arm 54, thereby tilting the bed plate 48 upwardly, until the tooth to be filed is brought into proper position for this purpose. Manifestly after the pin or roller 55 moves away from the arm 54, the spring 52 and spring 53, tensioned while the bed plate is moving upwardly, are called into use to lower the bed plate and its associated parts to normal active position. The bracket arm 14 is pivotally mounted upon the bracket 13 so that it may be adjusted with relation to the bracket arm 17, and carried by the bracket arm 14 is a lever 56 one end of which is formed with notches to cooperate with the bracket 54 for holding the moveable bracket arm fixed in its given position.

While it is believed that from the foregoing description the nature and advantages of the invention will be readily apparent, I desire to have it understood that I do not limit myself to what is herein illustrated and described, and that such changes may be restorted to when desired as fall within the scope of what is claimed.

What I claim is:—

1. A saw filing machine comprising a frame, means carried by the frame for supporting the saw for rotation, a pair of spaced parallel shafts, filing disks carried by said shafts and arranged slightly in advance of each other for simultaneously filing each tooth of the saw from opposite sides thereof, means including an operating handle for rotating said shafts, means controlled from said handle for intermittently rotating the saw to bring each successive tooth into proper relation with the filing means, means for shifting the said shafts and filing disks to an out of the way position while the saw is being rotated, and means for returning said shafts and disks to normal operative position after each rotation of the saw.

2. A saw filing machine comprising a frame, means carried thereby for supporting the saw for rotation, a pivotally mounted bed plate, a pair of parallel shafts journaled on said plate, filing disks carried by corresponding ends of the shafts and arranged slightly in advance of each other, whereby each tooth of the saw is simultaneously filed from the opposite sides thereof, means including an operating handle for rotating said shafts, means controlled by said handle for intermittently rotating the saw to bring each successive tooth into proper relation with said filing disks, means actuated from said handle for lifting the plate and shafts to an out of the way position while the saw is being rotated, and means for returning the bed plate and filing disks to normal operative position after each rotation of the saw.

In tesimony whereof I affix my signature.

JOSEPH JACKSON MOORE.